April 14, 1931.  A. E. TOMLINSON  1,800,368

DOUBLE VALVE CONSTRUCTION

Filed July 18, 1928  2 Sheets-Sheet 1

INVENTOR.
Alfred E. Tomlinson
BY
Fay, Oberlin & Fay
ATTORNEYS

April 14, 1931.  A. E. TOMLINSON  1,800,368
DOUBLE VALVE CONSTRUCTION
Filed July 18, 1928   2 Sheets-Sheet 2
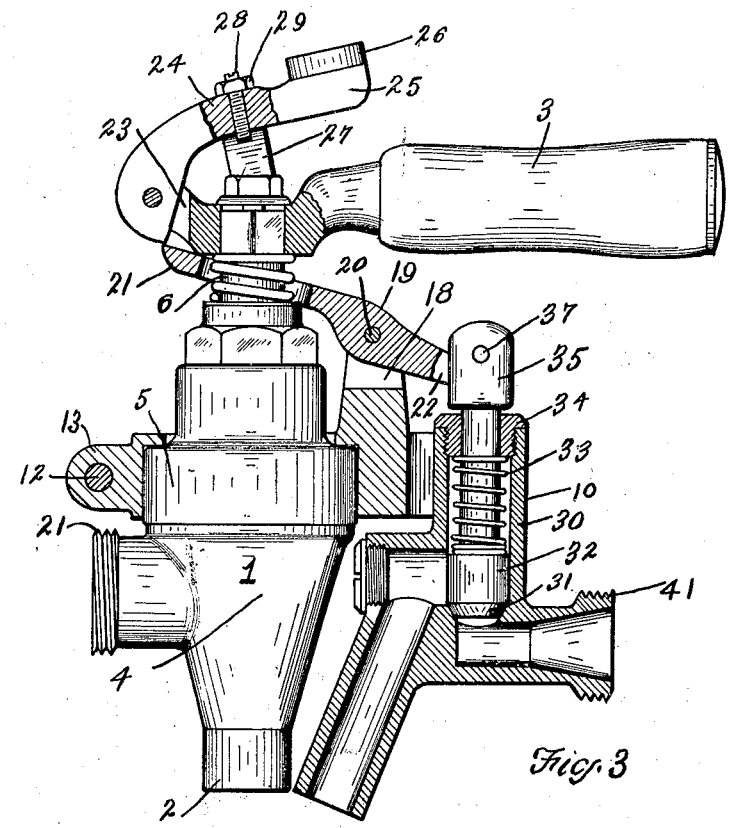
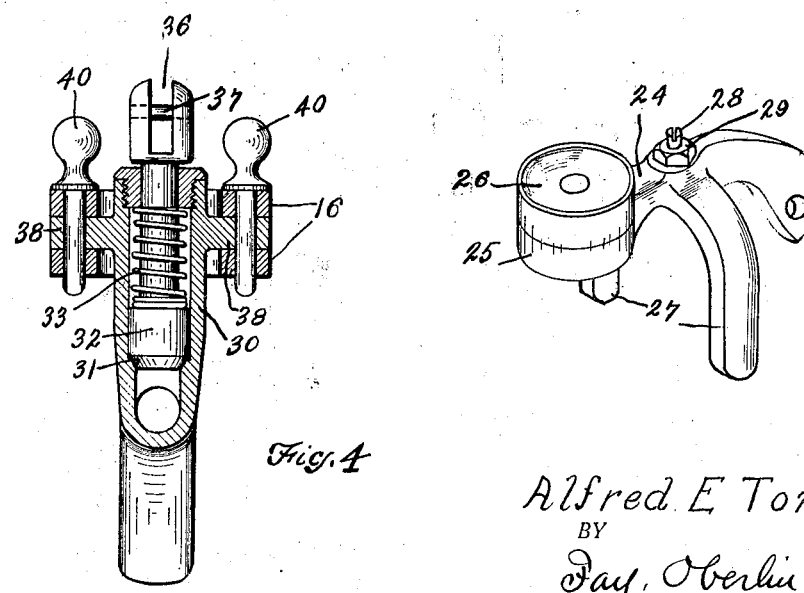
INVENTOR.
Alfred E. Tomlinson
BY
Fay, Oberlin & Fay
ATTORNEYS Patented Apr. 14, 1931

1,800,368

UNITED STATES PATENT OFFICE

ALFRED E. TOMLINSON, OF CLEVELAND HEIGHTS, OHIO

DOUBLE-VALVE CONSTRUCTION

Application filed July 18, 1928. Serial No. 293,653.

The present invention relates to faucets for coffee urns and the like and more particularly to the construction of a removable faucet for attachment to a coffee urn valve, the second faucet being adapted for connection to a cream or like container and being so arranged that it can be operated either simultaneously with the coffee valve or independently thereof and being also so arranged that the coffee valve may be operated independently of the cream faucet. Another feature of the construction is the provision of adjustable means for varying the opening of the cream valve to obtain any desired setting and the arrangement of the operating parts so as to obtain substantially the same operating movement for the cream valve regardless of its position relative to the coffee valve. Another feature of the invention is the means for mounting the cream valve so that it may be removed for cleaning without disturbing the other operating parts of the device. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 1:
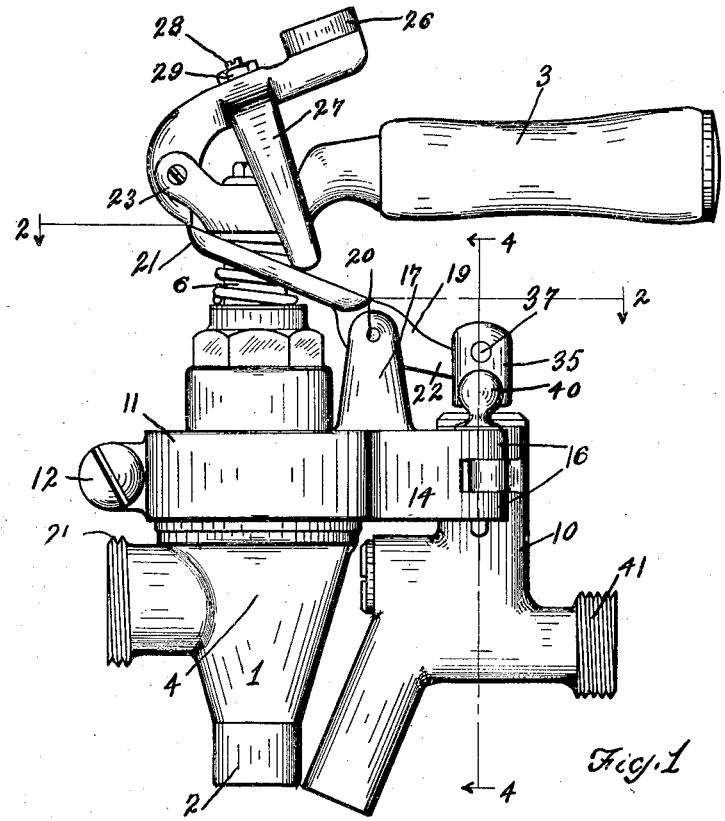
Figure 2:
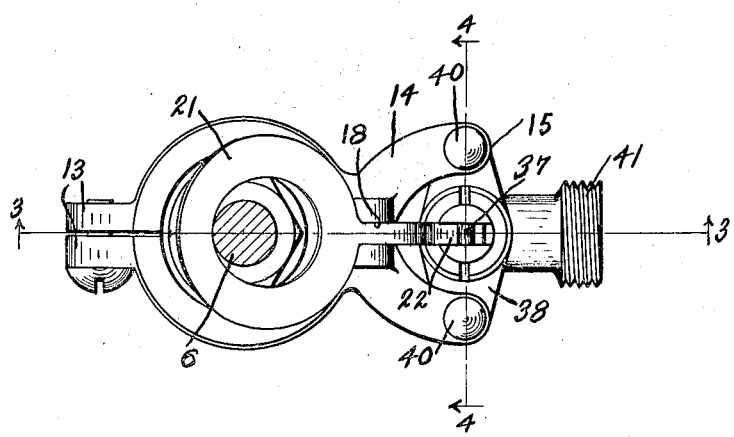

Fig. 1 is an elevational view of the present double valve construction; Fig. 2 is a sectional view on the line 2—2 of Fig. 1; Fig. 3 is a vertical sectional view on the line 3—3 of Fig. 2 but showing the coffee valve in elevation; Fig. 4 is a sectional view on the line 4—4 of Figs. 1 and 2; and Fig. 5 is a perspective view of the operating member for the cream valve.

The coffee urn valve 1 is of the type shown in my United States application, Serial No. 240,132 filed December 15, 1927 which is provided with a threaded boss 21 for engagement with the urn or urn fitting and having an outlet spigot 2 and an operating handle 3. The valve body 4 provides a cylindrical portion 5 above the threaded boss and the cream valve 10 is attached to the coffee valve at this cylindrical portion. The mounting mechanism consists of a split ring 11 adapted to fit around the cylindrical portion 5 of the coffee valve and to be clamped thereto in any adjusted position by means of the set screw 12 passing through the two ears 13 of the split ring. At a point diametrically opposed to the ears 13, the split ring is provided with a yoke 14, the ends 15 of which are grooved to provide two pairs of apertured ears 16. At the juncture of the yoke and the split ring, an upstanding boss 17 is provided which is slotted as at 18 to receive a pivotally mounted operating member 19 carried on a suitable pin 20; this operating member consisting of a ring 21 adapted to fit over and around the coffee valve spindle 6, the other end of the member consisting of an extending tongue 22. The operating handle 3 for the coffee valve is provided at one side with a pair of apertured lugs 23 to receive the operating handle 24 for the cream valve, this handle 24 consisting of a member pivotally connected to the ears and having a portion 25 extending toward the coffee valve handle and formed with an operating button 26 at its free end. Formed integrally with this member are two downwardly extending legs 27 which pass close to the operating handle and in line with the coffee valve spindle and which are adapted to engage with the ring 21 of the cream valve operating member. An adjusting screw 28 provided with a lock nut 29 extends through the cream valve handle to limit adjustably the downward movement of the same and of the legs and thus in turn limit the upward movement of the operating tongue 22.

The cream valve proper consists of a hollow valve body 30 having a cone shaped valve seat 31, the valve body carrying a plunger type of valve 32 normally held in its closed position by a coil spring 33, the the upper end 35 of the plunger extending outwardly above the bearing disk 34 and being provided with a slot 36 having a pin 37 extending across the upper portion of the slot. The valve body proper near its upper part has two horizontally extending flanges 38 which are adapted to fit between the pairs of ears 16 on the split ring and removable pins 40 are passed through the apertures in the ears and flanges to hold the cream valve in position with the tongue 22 of the operating member extending into the slot 36 in the plunger top and underneath the pin 37. The cream valve body is provided with an externally threaded extension 41 for attachment to the coupling connected to the cream container.

In using the cream valve, it may be mounted on the coffee urn valve in any position relative thereto by merely loosening the split ring and swinging the cream valve around the coffee urn valve. When it has been set in the desired position, the split ring is tightened and the two valves are held secure in the desired relative position. In operating the valves, the coffee urn valve may be rotated independently by means of the handle 3 without operating the cream valve if this is desired. When it is desirable to open the cream valve, the operating button is pushed downwardly and this may be used independently of the coffee urn valve handle or simultaneously therewith, the legs on the operating button member engaging with the ring of the cream valve operating member to lift the plunger valve upwardly to open the cream valve. When it is desired to clean the cream valve, this may be removed from the rest of the structure by uncoupling the valve from the cream line and by removing the pins which hold the cream valve to the adjustable split ring. This is accomplished without changing the setting of the operating mechanism or without the necessity of removing the split ring from the coffee urn valve.

The present structure provides an easily attachable cream valve for coffee urns and one which may be adjusted to obtain any desired valve opening and the setting is normally such as to allow the two valves to be operated simultaneously and to obtain the desired amount of cream while the coffee valve delivers a cup of coffee. The cream valve is easily removable for cleaning and without disturbing any of the other parts and is adjustable relative to the coffee valve so as to allow it to be so positioned as to be readily attached to a cream container wherever the container may be mounted.

Other modes of applying the principle of the invention may be employed instead of the one explained, change being made as regards the mechanism herein disclosed, provided the means stated by any of the following claims or the equivalent of such stated means be employed.

I therefore particularly point out and distinctly claim as my invention:—

1. In a double valve for urns, the combination of a valve adapted to be attached to an urn, and a second valve removably carried by said first valve, means for operating said first valve, and other means for operating said second valve, said two operating means being capable of independent or joint actuation.

2. In a double valve for urns, the combination of a valve adapted to be attached to an urn, and a second valve removably carried by said first valve, means for operating said first valve, and other means for operating said second valve, such latter means being carried by said first means and being arranged to be actuable without regard to the position of said first means.

3. In a double valve for urns, the combination of a valve adapted to be attached to an urn, a valve mounting adjustably attached to said valve, a second valve removably secured in said mounting, an operating handle for said first valve, an operating button for said second valve movably mounted on said handle, and mechanism connecting said button and said second valve for operating the latter in all adjusted positions.

4. In a double valve for urns, the combination of a valve adapted to be attached to an urn, a valve mounting adjustably attached to said valve, a second valve removably secured in said mounting, an operating handle for said first valve, an operating button for said second valve movably mounted on said handle, and mechanism connecting said button and said second valve for operating the latter in all adjusted positions, said button and connecting operating mechanism being operable jointly with said valve handle or independently thereof.

5. In a double valve mounting, the combination of a valve having a cylindrical body portion, a split ring adjustably mounted on said cylindrical body, a second valve body removably secured to said split ring, an operating handle for said first valve, an operating button member carried by said handle, and operating mechanism connected to said second valve and operable by said button member to allow independent operation of said two valves or joint operation thereof.

6. In a double valve mounting, the combination of a valve having a cylindrical body portion, a split ring adjustably mounted on said cylindrical body, a second valve body removably secured to said split ring, an operating handle for said first valve, an operating button member carried by said handle, and operating mechanism connected to said second valve and operable by said button member to allow independent operation of said two valves or joint operation thereof, and movable means on said button member for adjusting the operating movement of said second valve.

7. In a double valve mounting, the combination of a valve having a cylindrical body portion, a valve member in said body portion and having a spindle, a split ring adjustably mounted on said cylindrical body, a second valve body removably secured to said split ring, a valve member in said second valve body, an operating handle for said first valve member, an operating button member carried by said handle, and operating mechanism connected to said second valve member and operable by said button member to allow independent operation of said two valve members or joint operation thereof, said mechanism consisting of a pivotally mounted operating member having a ring surrounding said first valve spindle and a tongue in operative relation to said second valve member, said operating button member being adapted to engage said ring in all adjusted positions of said two valve members.

8. In a double valve mounting, the combination of a valve having a cylindrical body portion, a rotary valve plug in said body portion and having a spindle, a split ring adjustably mounted on said cylindrical body, a second valve body removably secured to said split ring, a reciprocable valve plunger in said second valve body, an operating handle for said rotary valve, an operating button member carried by said handle, and operating mechanism connected to said reciprocable valve and operable by said button member to allow independent operation of said two valves or joint operation thereof, said mechanism consisting of a pivotally mounted operating member having a ring surrounding said valve plug spindle and a tongue in operative relation to said valve plunger, said operating button member being adapted to engage said ring in all adjusted positions of said two valves, and means on said button member for limiting its movement to limit the movement of said operating member and the opening of said reciprocable valve.

9. In a device of the class described, the combination of a valve including a casing, a clamp mounted on said casing, means for operating said valve, a second valve including a casing secured to said clamp, and means for operating said second valve including a member mounted on said first operating means and operable independently of said first operating means.

10. In a device of the class described, the combination of a valve including a casing, a clamp mounted on said casing, means for operating said valve, a second valve including a casing removably mounted on said clamp, and means for operating said second valve including a member mounted on said first operating means and operable independently of said first operating means.

11. In a device of the class described, the combination of a valve including a casing, a clamp mounted on said casing, means for operating said valve, a pair of spaced bifurcated ears on said clamp, a second valve including a casing, a pair of projections on said second casing, said ears and said projections being perforated, and said projections being adapted to be received between the furcations of said ears, and a pin extending through the perforations of each of said ears and its respective projection.

12. In a device of the class described, the combination of a valve including a casing, a clamp mounted on said casing, means for operating said valve, a pair of spaced bifurcated ears on said clamp, a second valve including a casing, a pair of projections on said second casing, said ears and said projections being perforated, and said projections being adapted to be received between the furcations of said ears, and a pin extending through the perforations of each of said ears and its respective projection, and means for operating said second valve including a member mounted on said first operating means and operable independently of said first operating means.

13. In a device of the class described, a valve including a casing, operating means for said valve, a second valve including a casing carried by said first casing, and operating means for said second valve mounted adjacent said first operating means whereby said second operating means may be conveniently operated by the same hand used to operate said first operating means.

14. In a device of the class described, a valve casing, a valve in said casing, a handle for said valve, a second valve casing carried by said first casing, a valve in said second casing, and means carried by said handle for operating said second valve, said means being mounted for convenient operation by the thumb of the hand grasping said handle.

15. In a device of the class described, a valve casing, a rotary valve in said casing, a handle for said valve, a second valve casing carried by said first casing, a reciprocating valve in said second casing, and means carried by said handle for operating said reciprocating valve, said means being mounted for convenient operation by the thumb of the hand grasping said handle.

Signed by me this 16th day of July, 1928.

ALFRED E. TOMLINSON.